(12) United States Patent
Shvodian et al.

(10) Patent No.: US 7,548,561 B2
(45) Date of Patent: Jun. 16, 2009

(54) METHOD OF TRANSMITTING AND RECEIVING DATA

(75) Inventors: William M. Shvodian, McLean, VA (US); Matthew L. Welborn, Vienna, VA (US); Joel Z. Apisdorf, Reston, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 744 days.

(21) Appl. No.: 11/128,267

(22) Filed: May 13, 2005

(65) Prior Publication Data

US 2006/0256818 A1    Nov. 16, 2006

(51) Int. Cl.
*H04J 3/24* (2006.01)
(52) U.S. Cl. .................... 370/473; 370/235
(58) Field of Classification Search ............. 370/493, 370/473
See application file for complete search history.

(56) References Cited

U.S. PATENT DOCUMENTS

| | | | |
|---|---|---|---|
| 6,084,888 A * | 7/2000 | Watanabe et al. ........... 370/473 |
| 6,445,717 B1 * | 9/2002 | Gibson et al. ............... 370/473 |
| 7,310,353 B1 * | 12/2007 | Bourlas et al. .............. 370/473 |
| 2002/0101839 A1 | 8/2002 | Farley et al. |
| 2002/0151391 A1 | 10/2002 | Gelinas |
| 2003/0003905 A1 | 1/2003 | Shvodian |
| 2004/0141489 A1 | 7/2004 | Benveniste |
| 2004/0170121 A1 | 9/2004 | Kim et al. |
| 2006/0013255 A1 * | 1/2006 | Kuskin .................... 370/473 |
| 2006/0280204 A1 * | 12/2006 | Nagata et al. .............. 370/473 |

OTHER PUBLICATIONS

International Search Report and Written Opinion.

* cited by examiner

*Primary Examiner*—Ricky Ngo
*Assistant Examiner*—Ben H Liu

(57) ABSTRACT

A method is provided for operating a transceiver that comprises: transmitting a preamble; transmitting an outer header identifying parameters of an outer payload, after transmitting the preamble; and transmitting the outer payload after transmitting the outer header. The transmitting of the outer payload includes: transmitting an inner header identifying parameters of an inner payload; transmitting an inner payload after transmitting the inner header; and repeating the transmitting of the inner header and the transmitting of the inner payload a plurality of times. A corresponding method of operating a receiver functions by receiving each of these transmitted elements.

25 Claims, 7 Drawing Sheets

METHOD OF TRANSMITTING AND RECEIVING DATA

FIELD OF THE INVENTION

The present invention relates in general to the operation of a wireless network, and more particularly to a method of sending and receiving data that reduces the overhead required to pass the data while maintaining the continuity and predictability of a data transmission stream.

BACKGROUND OF THE INVENTION

In any data transmission scheme it generally desirable to send data from a source to a destination as quickly as possible. However, it is also generally necessary to send a certain amount of overhead information along with the data in order that the transmitted data will be successfully received and processed.

The overhead information may tell a destination device how to acquire an incoming signal; it might identify what kind of a signal is being sent; it might tell a destination device how much data is being sent or in what format the data is being sent in, or the like. But while this information is important, it is not the same as the underlying data to be sent. And time spent sending overhead information is time that is not spent sending data. Thus, the greater the amount of overhead data that is associated with a given set of transmission data, the lower the transmission throughput of that data will be.

However, the overhead data serves a real purpose, namely to facilitate the transfer and successful receipt of the data. And so if the overhead information is reduced in size too much, then it may fail in this purpose and the data transfer might fail. This would also cause the data transmission speed to be reduced since it would require certain sets of data must be retransmitted.

It is therefore desirable to reduce the amount of overhead information that is used for a given amount of transmission data, without significantly increasing the chance that a particular data transmission will fail, and minimizing the necessary measures to correct any errors that do occur.

Furthermore, some systems will use an acknowledgement mechanism whereby successful receipt of data sent from a source device to a destination device will be acknowledged by a return transmission including acknowledgment information from the destination device back to the source device. In this case, the acknowledgement information provides a valuable indication regarding whether data was successfully received, but also takes up channel time that could otherwise be used for data transmission.

Thus, when an active acknowledgement policy is used, it is desirable to minimize the amount of channel time used to achieve successful signal acknowledgement.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Wireless Network

Figure 1:
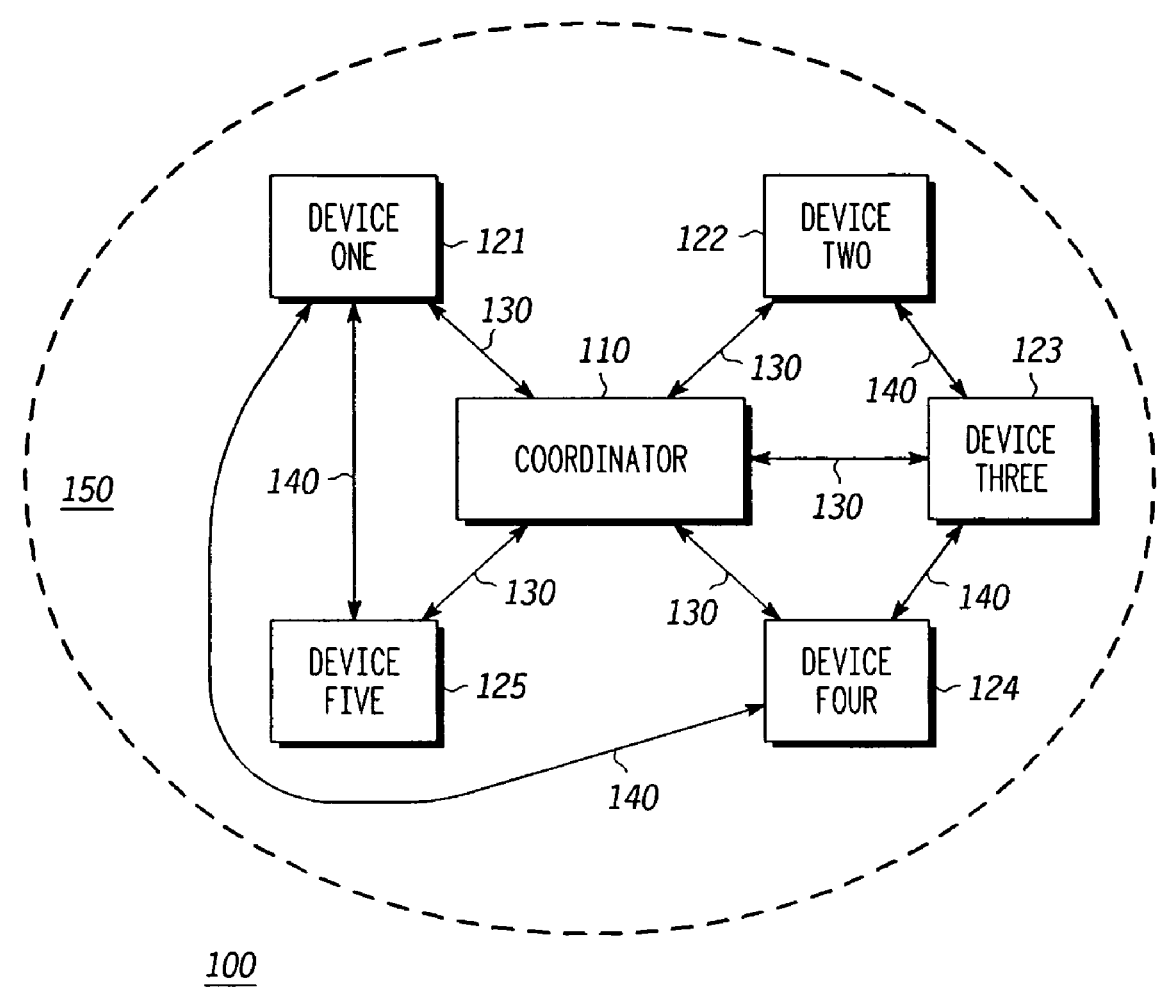
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wired or wireless network.

When the term piconet is used, it refers to a wireless network of devices connected in an ad hoc fashion, having one device act as a coordinator (i.e., it functions as a master) while the other devices (sometimes called stations) follow the time allocation instructions of the coordinator (i.e., they function as slaves). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicates with every device 121-125 in the network 100. In other embodiments the coordinator 110 may be a separate designated control unit that does not function as one of the devices 121-125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Although a wireless network is described with reference to FIG. 1, and the disclosure refers to this wireless network by way of example, the current claimed invention is equally applicable to wired networks. By way of example the present claimed invention could be applied to wireless networks of the sort defined by the IEEE 802.11 standard or the IEEE 803.15.3 standard, the proposed IEEE 802.15.3b standard, by a wired Ethernet network, or by any other suitable wired or wireless network.

Basic Frame Structure

In the network 100 disclosed in FIG. 1, data may be sent between devices 110, 121-125 in the form of discrete packets or frames. For each frame the device 110, 121-125 that transmits the frame can be considered the source device, and the device 110, 121-125 that receives the frame can be considered the destination device. In some cases a frame may be sent to multiple devices at one time, in which case the frame will have multiple destination devices.

Each of these frames will include a certain amount of overhead information and a certain amount of payload. The overhead information includes information needed to acquire or process an incoming signal. The payload can include whatever data is to be passed, whether that is original data or acknowledgement data. For the sake of simplicity the term frame will be used throughout the specification. However it is understood that other data transmission formats could be used.

Figure 2:
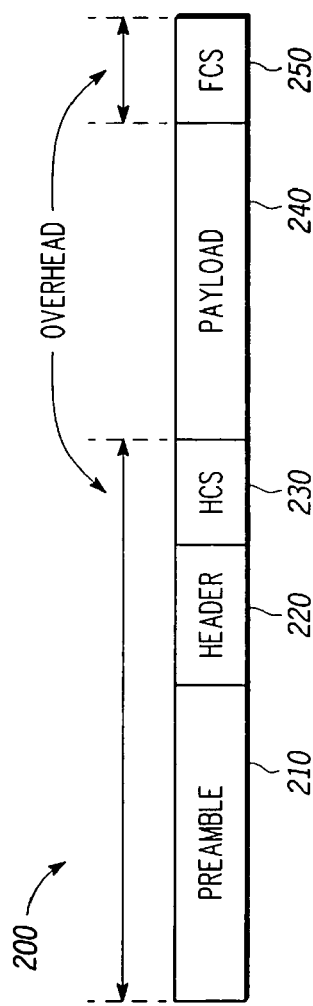
FIG. 2 is a block diagram of a basic frame structure according to a disclosed embodiment of the present invention.

FIG. 2 is a block diagram of a basic frame structure according to a disclosed embodiment of the present invention. As shown in FIG. 2, the frame 200 includes a preamble 210, a header 220, a header check sequence (HCS) 230, a payload 240, and a frame check sequence (FCS) 250.

The preamble 210 is a known bit pattern with good auto-correlation and cross-correlation properties that can be used by a destination device to acquire an incoming frame of indeterminate phase. A typical preamble might have a transmission duration at operational speeds on the order of 15 microseconds total, though this can vary widely in different embodiments and different transmission speeds.

The header 220 includes a variety of data that identifies the data frame 200, and may include information relating to: a source address for the frame 200, a destination address for the frame 200, a frame type, a frame length, an acknowledgement policy used, a frame sequence number, a fragment number, various control fields, or any other frame parameters that might be of use to the destination device. A typical header might have a transmission duration at operational speeds on the order of 10 to 2000 ns, depending upon the transmission speed. For example, in IEEE 802.15.3 systems the header is fourteen bytes, which falls roughly in the range of 500 to 1500 ns if the transmission speed is 110 Mb/s or greater. Alternate headers 220 can, of course, be larger or smaller, with a corresponding change in transmission duration.

The HCS 230 is a bit sequence that can be used to confirm proper receipt of the header 220. For example, the HCS 230 could be a multiple-bit cyclical redundancy check sequence that can confirm the bit values passed in the header 220.

The payload 240 carries the data that needs to be passed from the source device to the destination device. It could be acknowledgement information, audio, video, voice, data, or whatever is desirable to pass from one device to another.

The FCS 250 is a bit sequence that can be used to confirm proper receipt of either the payload 240 or the entire frame 200. For example, the FCS 250 could be a multiple-bit cyclical redundancy check sequence that can confirm the bit values passed in either the payload 240 or the entire frame 200.

Although every frame will generally have a preamble 210, a header 220, a payload 240, and an FCS 250, the HCS 230 may be eliminated in alternate embodiments. In this case the FCS should cover both the header 220 and the payload 240. In addition, some frames 200 may be able to eliminate the payload 240 and pass desired information based either on what is contained in the header 220 or on the very existence of the frame 200 itself. For example, certain immediate acknowledgement frames might acknowledge receipt of a sent frame simply by the fact that the acknowledgement frame was sent. Other acknowledgement frames could identify an acknowledged frame through information contained in the header 220, such as a source device identifier of the source of the device that sent the frame to be acknowledged.

For simplicity of disclosure some of the examples below will omit showing an HCS 230 or an FCS 250. However, even though not shown, an FCS 250 will occur at the end of each disclosed frame 200, and an HCS 230 can be included after any disclosed header 220.

In the data frame disclosed in FIG. 2, the length of the preamble 210, the header 220, the HCS 230 (if any), and the FCS 250 represents overhead, as does any payload 240 in an acknowledgement frame. In contrast, a payload 240 in a data frame represents the only time that is spent passing data between two devices.

Acknowledgement Policies

A variety of acknowledgement policies can be used, each requiring a different amount of overhead to provide the desired acknowledgment service.

In a policy of immediate acknowledgement, a destination device sends an acknowledgement frame immediately after receiving a data frame to indicate successful receipt of the data frame. This acknowledgement frame could include an acknowledgement payload that identifies the data frame to be acknowledged; it could have no payload and include information in the header that identifies the data frame to be acknowledged; or it could have no payload and identify the data frame to be acknowledged by the time the acknowledgement frame was sent (i.e., right after the data frame was sent).

In a policy of delayed acknowledgement, a destination device sends an acknowledgement frame some time after receiving a data frame to indicate successful receipt of the data frame. This delayed acknowledgement frame may include an acknowledgement payload that identifies the data frame to be acknowledged; or it could have no payload and include information in the header that identifies the data frame to be acknowledged.

In some embodiments a delayed acknowledgement frame acknowledges a single data frame; in others it can acknowledge multiple data frames at the same time. In this latter case an acknowledgement payload will be required to identify all of the data frames that are being acknowledged.

Alternate Frame Structures

A variety of frame structures can be used to limit the amount of overhead needed to pass data. Two examples of this are an aggregated data frame and a burst data frame.

In an aggregated data frame a single preamble 210 and header 220 are sent, but multiple individual payloads 240 are passed within the same aggregated data frame. This makes for a larger aggregated data frame, but limits the amount of overhead information required.

Essentially multiple individual payloads are aggregated into a single aggregated payload that is sent using the same preamble 210 and header 220. Thus, if the aggregated frame successfully passes from a source device to a destination device, this will allow the system to achieve significant savings in overhead. Specifically, if there are N individual payloads in the aggregated frame (where N is an integer), the system can avoid sending (N−1) preambles 210 and (N−1) headers 220, as compared with sending the individual payloads in individual frames.

However, this approach decreases the efficiency of the data transmission whenever an aggregated frame must be resent. Consider if the aggregated frame suffers sufficient bit errors in a single individual payload in the aggregated payload that the aggregated frame cannot correct. In this case the entire aggregated data frame, including the aggregated data payload with all its individual data payloads, will be corrupted and will have to be retransmitted, even if the error is only in a single individual data payload within the aggregated data payload. In an aggregated frame, the entire frame is either received correctly or not.

A burst frame avoids this problem at the cost of additional overhead. Like an aggregated frame, a burst frame includes multiple individual payloads 240 in a single burst frame. However, unlike an aggregated frame, a burst frame includes a single preamble 210, but an individual header 220 for each of the individual payloads 240 in the burst frame. As a result of this, if there are N individual payloads 240 in the burst frame (where N is an integer), the system can avoid sending (N−1) preambles 210, as compared with sending the individual payloads 240 in individual frames.

While this is less of an overhead savings than for an aggregated frame, it does not suffer the same cost for a failed transmission. In particular, if a single data payload 240 is corrupted during transmission, the destination device can identify the lost payload 240 from the parameters in the header 220 associated with that individual payload 240. Then the destination device can request that the source device retransmit only the corrupted individual payload 240 in a later burst frame.

This is generally a good tradeoff since, as between the preamble 210 and the header 220, the preamble 210 is generally the longer of the two. In an IEEE 801.15.3 frame structure, for example, the preamble 210 is roughly 15 µs and the header 220 is on the order of 1 µs.

However, burst frames can still suffer from significant problems when data is corrupted during transmission. As noted above, if the corrupted data is in an individual payload 240, the destination device can simply identify that individual payload 240 as a failure. But if the corrupted data is in one of the individual headers 220, then the destination device might lose track of the entire burst frame, since it is the headers that tell the destination device the parameters of the individual payloads 240, including payload length, and when the burst frame will end.

If a destination device misses a single header 220, it will not know how long the payload 240 associated with that header 220 will be. This in turn means that the destination device doesn't know when to look for the next header 220 and might miss receiving a subsequent payload 240 in the burst frame. Furthermore, if a lost header 220 was the last header in the frame, the destination device won't know that the current frame has come to an end. In this case, the destination device might fail to move from a receive mode to an acquisition mode at the proper time, which might cause it to miss acquiring a subsequent burst frame. This would then require all lost payloads, including the lost payloads of the burst frame and all of the payloads in the entire second burst frame, to be retransmitted, which would serve to reduce data transmission throughput for the system.

It should be noted that when a plurality of individual payloads are included in a single aggregated payload or burst payload, these individual data payloads could be data payloads or acknowledgement payloads.

Layered Burst Frame

Figure 3:
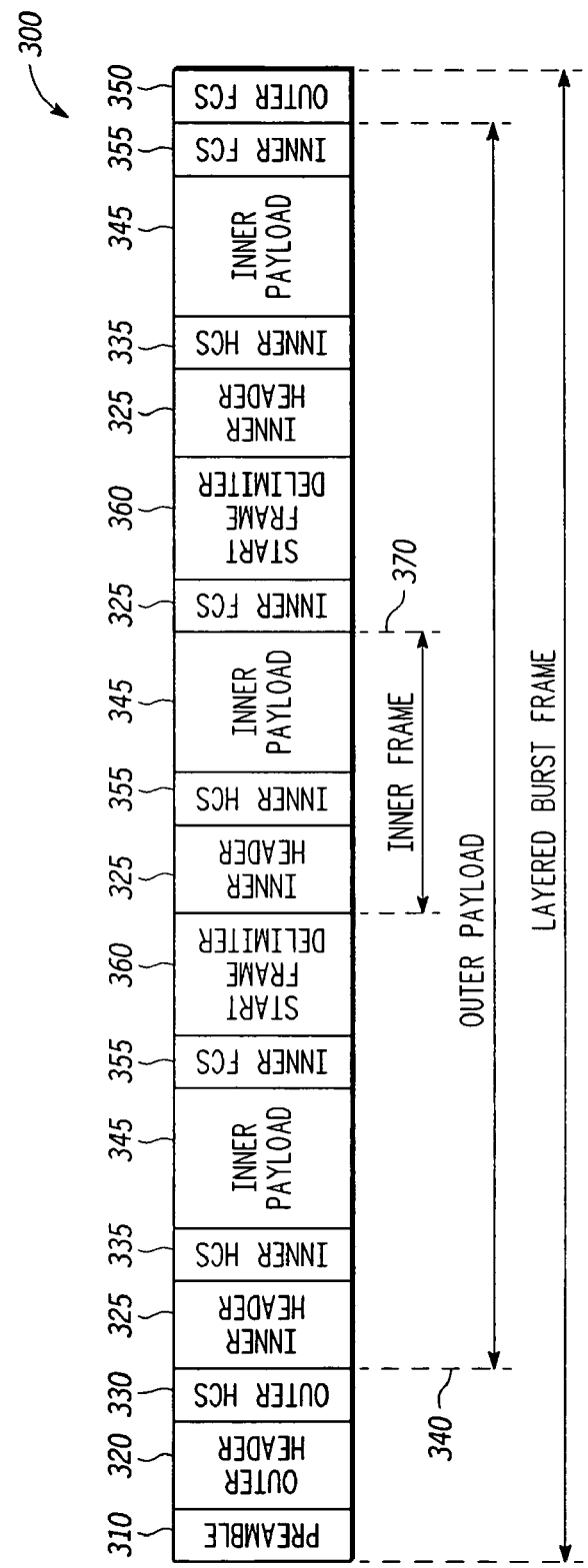
FIG. 3 is a block diagram of a layered burst frame according to a disclosed embodiment of the present invention.

FIG. 3 is a block diagram of a layered burst frame according to a disclosed embodiment of the present invention. The layered burst frame limits the danger of burst errors in individual payload headers by including both an outer header to define an outer payload, and inner headers to identify a plurality of inner payloads within the outer payload.

As shown in FIG. 3, a layered burst frame 300 includes a preamble 310, an outer header 320, an outer header check sequence (HCS) 330, an outer payload 340, and an outer frame check sequence (FCS) 350.

The preamble 310 is a known bit pattern with good auto-correlation and cross-correlation properties that can be used by a destination device to acquire an incoming frame of indeterminate phase. A typical preamble might have a transmission duration at operational speeds on the order of 15 microseconds total, though this can vary widely in different embodiments and different transmission speeds.

The outer header 320 includes a variety of data that identifies the layered burst frame 300, and may include information relating to: a source address for the frame 300, a destination address for the frame 300, a frame type, a frame length, an acknowledgement policy used, a frame sequence number, a fragment number, various control fields, or any other frame parameters that might be of use to the destination device. As noted above, a typical header might have a transmission duration at operational speeds on the order of 10 to 2000 ns, depending upon the transmission speed.

The outer HCS 330 is a bit sequence that can be used to confirm proper receipt of the outer header 320. For example, the outer HCS 330 could be a multiple-bit cyclical redundancy check sequence that can confirm the bit values passed in the outer header 320.

The outer payload 340 contains a plurality of inner frames 370 separated by a plurality of start frame delimiters 360.

The outer FCS 350 is a bit sequence that can be used to confirm proper receipt of either the outer payload 370 or the entire layered burst frame 300. For example, the outer FCS 350 could be a multiple-bit cyclical redundancy check sequence that can confirm the bit values passed in either the outer payload or the entire layered burst frame 300.

The inner frames 370 are individual frames that pass the desired data from a source device to one or more destination devices. Each inner frame 370 includes an inner header 325, an inner header check sequence (HCS) 335, an inner payload 345, an inner frame check sequence (FCS) 355.

Each inner header 325 includes a variety of data that identifies the associated inner frame 370, and may include information relating to: a source address for the inner frame 370, a destination address for the inner frame 370, a frame type, a frame length, an acknowledgement policy used, a frame sequence number, a fragment number, various control fields, or any other frame parameters that might be of use to the destination device. As noted above, a typical header could be anywhere from 10 ns to 2 µs in duration.

Each inner HCS 335 is a bit sequence that can be used to confirm proper receipt of the inner header 325. For example, an inner HCS 325 could be a multiple-bit cyclical redundancy check sequence that can confirm the bit values passed in the associated inner header 325.

Each inner payload 345 carries the data that needs to be passed from the source device to the destination device. It could be It could be acknowledgement information, audio, video, voice, data, or whatever is desirable to pass from one device to another.

Each inner FCS 355 is a bit sequence that can be used to confirm proper receipt of an entire inner frame 370. For example, an inner FCS 355 could be a multiple-bit cyclical redundancy check sequence that can confirm the bit values passed in the associated inner frame 370.

Each start frame delimiter 360 is located between two inner frames 370 within the outer payload 340. A start frame delimiter is a known bit sequence that indicates the beginning of a frame. A good start frame delimiter 360 is a known bit sequence that is considered to have a low probability of appearing within an inner frame 370. In the disclosed embodiment the start frame delimiter 360 is 32 or 64 bits long, though it could be larger or smaller in alternate embodiments.

There is no need for a frame delimiter 360 before the first inner frame 370, since the outer header 320 provides a clear indication of when the outer payload 340 begins. And there is no need for a frame delimiter 360 after the last inner frame 370, since the outer header 320 provides a clear indication of when the outer payload 340 ends.

Although every layered burst frame 300 will have an outer preamble 310, an outer header 320, an outer payload 340, and outer FCS 350, and each inner frame 370 will have an inner header 335 and an inner FCS 355, the outer HCS 330, the inner HCSs 335, and the start frame delimiters 360 may be eliminated in whole or in part in alternate embodiments.

In addition, some inner frames 370 may be able to eliminate the inner payload 345 and pass desired information based either on what is contained in the inner header 325 or on the very existence of the inner frame 370 itself. For example, certain inner frames 370 may serve as immediate acknowledgement frames that acknowledge receipt of a sent frame simply by the fact that the acknowledgement frame was sent. Other inner frames 370 may serve as acknowledgement frames that identify an acknowledged frame through information contained in the inner header 325, such as a source device identifier of the source of the device that sent the frame to be acknowledged.

For simplicity of disclosure the examples below will omit showing outer HCSs 330, inner HCSs 335, outer FCSs 350, inner FCSs 355, and start frame delimiters 360. However, an outer HCS 330 can be included after any disclosed outer header 320, an inner HCS 335 can be included after any disclosed inner header 325, an outer FCS 350 is included at the end of any disclosed outer frame 300, an inner FCS 355 is included at the end of any disclosed inner frame 370, and a start frame delimiter 360 can be included between any adjacent inner frames 370 in an outer payload 340.

By providing an outer header 320 in addition to the plurality of inner headers 325, the layered burst frame 300 gains almost all of the benefit of a regular burst frame, but significantly reduces the chance that the destination device will lose track of the entire frame structure if an inner header 325 is lost. This chance is further reduced by providing start frame delimiters 360 between inner frames 370.

Because the outer header 320 provides parameters for the outer payload 340, the destination device can only lose track of at most one outer payload 340, providing it successfully receives the outer header 320. Even if the destination device fails to receive one inner payload 345, and even if it fails to correctly identify a subsequent inner header 325, the outer header 320 will have told the destination device when the outer payload 340 ends, and so the destination device will know when to stop looking for a new inner header 325 and move to an acquisition process for acquiring a new frame.

And if the outer payload 340 includes start frame delimiters 360, even if the destination device loses a single inner frame 345, the start frame delimiter 360 will provide a greater chance that the destination device will locate the next inner header 325 for the next inner frame 345.

Furthermore, if an inner HCS 335 is used, the combination of start frame delimiter 360 and inner HCS 335 would decrease the chance of a random set of payload bits falsely indicating the start of a new frame. For this kind of an error to take place the payload bits would have to have a bit sequence equal to the start frame delimiter 360, and then another bit sequence equal to the correct HCS 335. If the start frame delimiter 360 and the HCS 335 are of moderate size, this will result in a comparatively low probability of such an error.

Acquisition Using a Layered Burst Frame

A layered burst frame 300 can use all of the acknowledgement policies disclosed above. Examples of this are provided in FIGS. 4 through 8.

Figure 4:
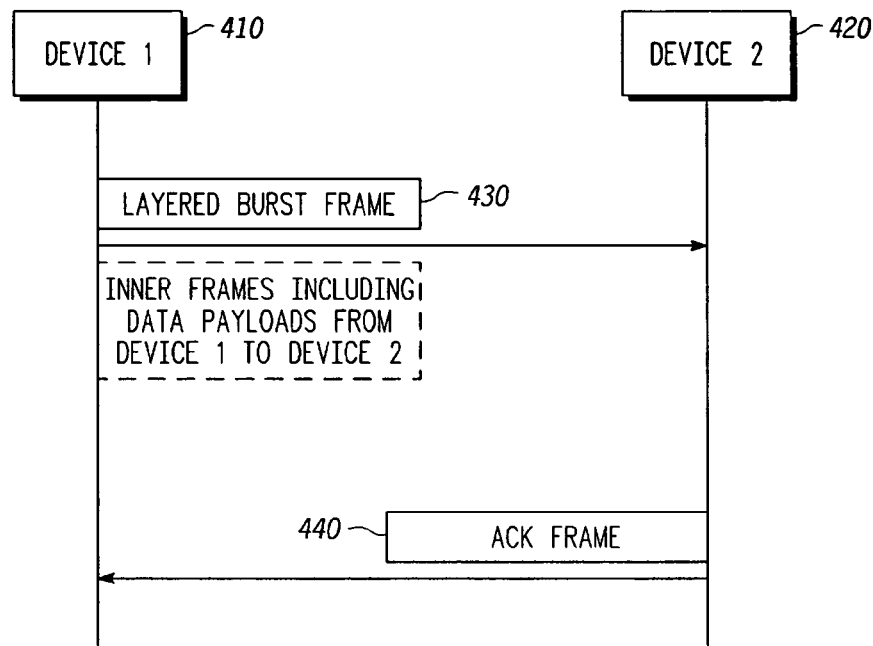
FIG. 4 is a message sequence chart showing the frame transmission using a delayed acknowledgement policy according to a disclosed embodiment of the present invention.
Figure 5:
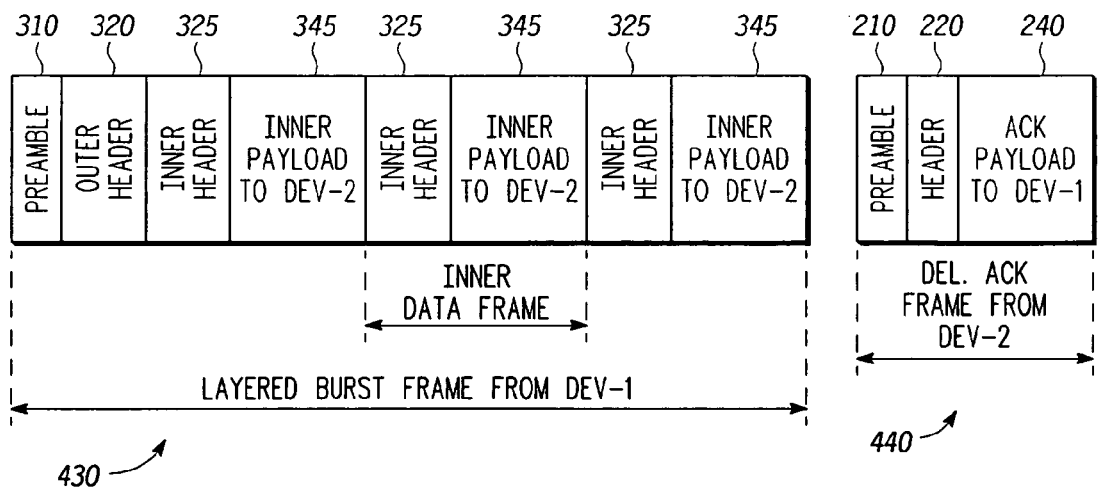
FIG. 5 is a block diagram of the frame transmission of FIG. 4 according to a disclosed embodiment of the present invention.
Figure 6:
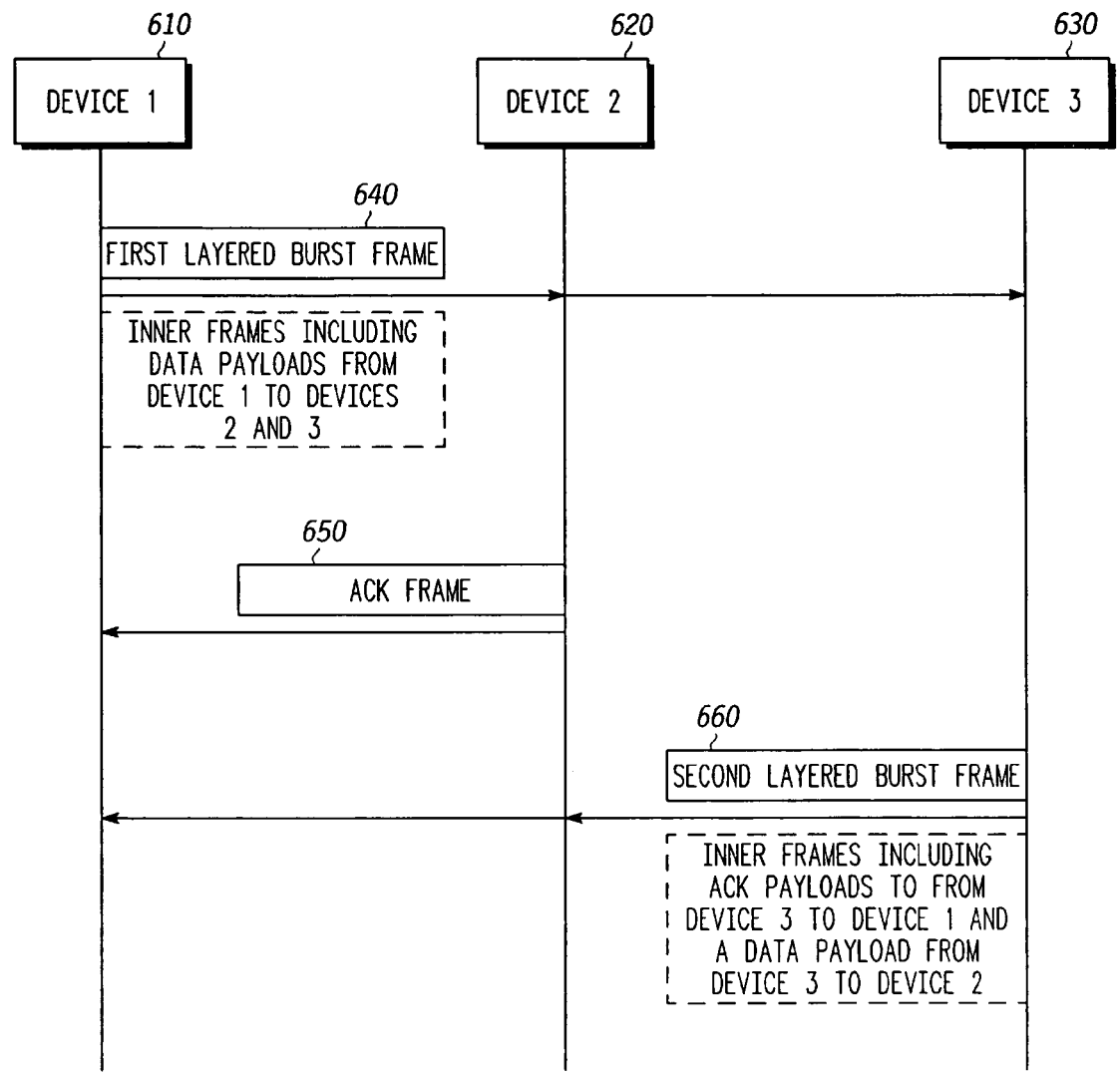
FIG. 6 is a message sequence chart showing the frame transmission in which acknowledgement frames are sent in a layered burst frame according to a disclosed embodiment of the present invention.
Figure 7:
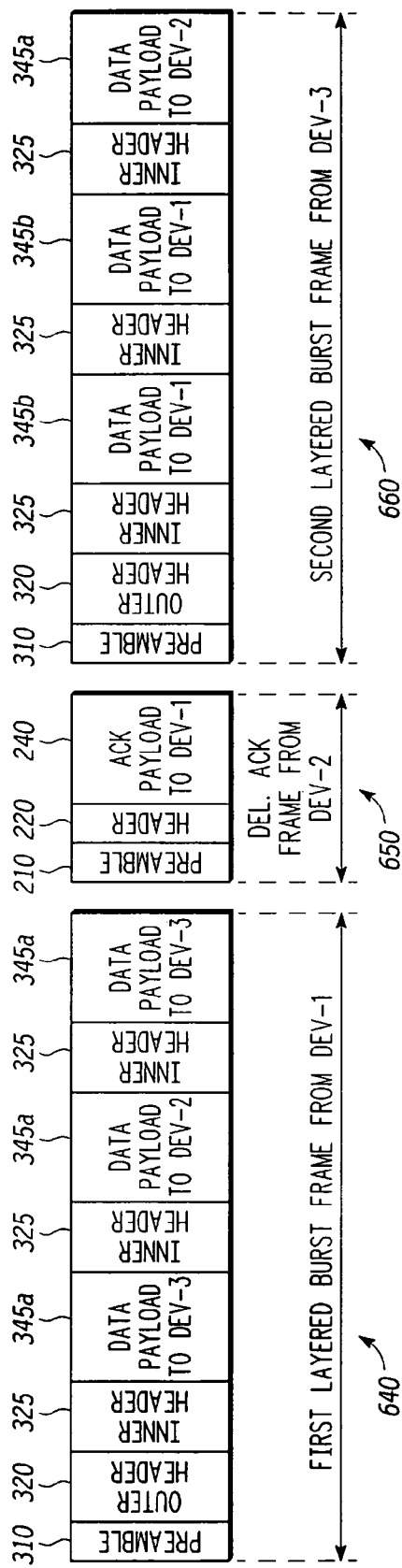
FIG. 7 is a block diagram of the frame transmission of FIG. 6 according to a first disclosed embodiment of the present invention.
Figure 8:
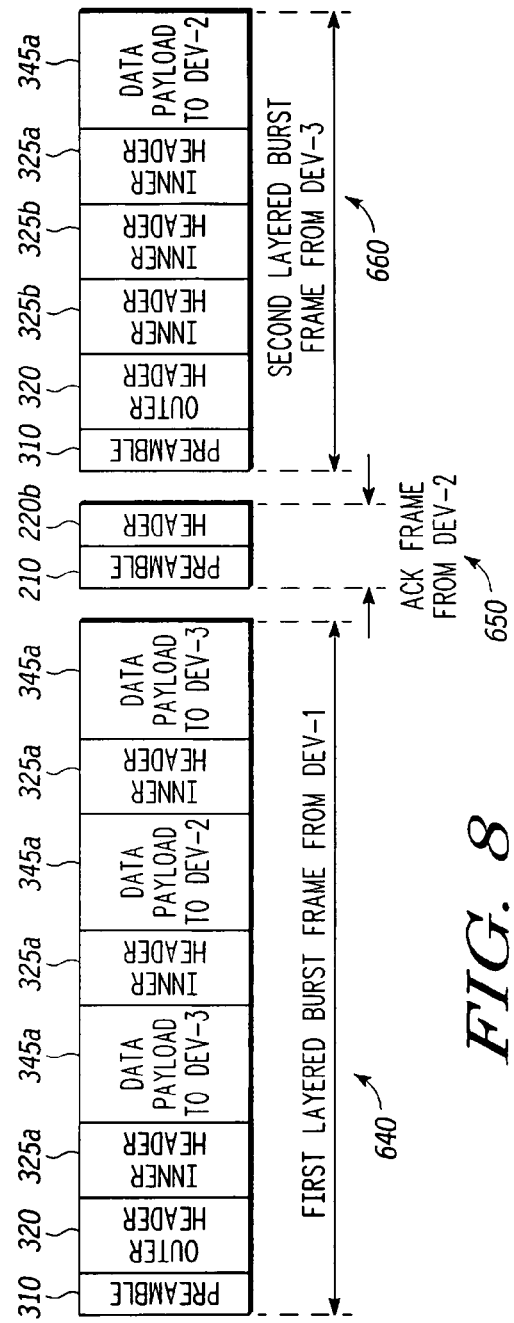
FIG. 8 is a block diagram of the frame transmission of FIG. 6 according to a first disclosed embodiment of the present invention.

FIG. 4 is a message sequence chart showing the frame transmission using a delayed acknowledgement policy according to a disclosed embodiment of the present invention, while FIG. 5 is a block diagram of the frame transmission of FIG. 4 according to a disclosed embodiment of the present invention. FIG. 6 is a message sequence chart showing the frame transmission in which acknowledgement frames are sent in a layered burst frame according to a disclosed embodiment of the present invention. FIG. 7 is a block diagram of the frame transmission of FIG. 6 according to a first disclosed embodiment of the present invention; and FIG. 8 is a block diagram of the frame transmission of FIG. 6 according to a second disclosed embodiment of the present invention.

As shown in FIG. 4, a layered burst frame 430 is sent from a first device 310 to a second device 320. The second device then sends an acknowledgement frame 440 back to the first device.

As shown in FIG. 5, the layered burst frame 430 includes a preamble 310, an outer header 320, a plurality of inner headers 325, and a plurality of inner payloads 345 for the second device 420. The acknowledgement frame 440 includes a preamble 210, a header 220, and an acknowledgement payload 240 for the first device 410.

In this disclosed embodiment, the acknowledgement frame 440 is a delayed acknowledgement frame, and the acknowledgement payload 240 includes information that acknowledges all of the inner payloads sent from the first device 410 to the second device 420.

By using a layered burst frame 430 to send data payloads from the first device 410 to the second device 420, and a delayed acknowledgement frame 440 from the second device 420 to the first device 410 to acknowledge the data payloads, the system efficiently passes the desired data while limiting the required overhead. In addition, more complex acknowledgement processes are possible.

As shown in FIG. 6, a first device 610 transmits a first layered burst frame 640 to both the second device 620 and a third device 630 that includes inner frames having data payloads addressed to the second and third devices 620 and 630. The second device 620 then transmits an acknowledgement frame 650 back to the first device 610, and the third device 630 sends a second layered burst frame 660 to both the first device 610 and the second device 620 that includes inner acknowledgement frames addressed to the first device 610 and an inner data frame addressed to the second device 620.

As shown in the embodiment of FIG. 7, the first layered burst frame 640 includes a preamble 310, an outer header 320, a three inner headers 325, and three of inner data payloads 345a for the second and third devices 620 and 630. The acknowledgement frame 650 includes a preamble 210, a header 220, and an acknowledgement payload 240 for the first device 610. The second layered burst frame 660 includes a preamble 310, an outer header 320, three inner headers 325, one inner data payload 345a for the second device 620, and two inner acknowledgement payloads 345b for the first device 610.

This embodiment shows that acknowledgement frames can be sent separately or in a layered burst frame, as desired.

The second device 620 acknowledges the data frame from the first device 610 using a separate acknowledgement frame 650, while the third device 630 acknowledges the two data frames from the first device 620 using acknowledgement frames in the second layered burst frame 660.

As shown in the embodiment of FIG. 8, the first layered burst frame 640 includes a preamble 310, an outer header 320, a three inner headers 325, and three of inner data payloads 345a for the second and third devices 620 and 630. The acknowledgement frame 650 includes a preamble 210 and a header 220. The second layered burst frame 650 includes a preamble 310, an outer header 320, one inner data header 325a, one inner data payload 345a for the second device 620, and two inner acknowledgement headers 325b, acknowledging payloads from the first device 610.

In the embodiment of FIG. 8, acknowledgement frames comprise just a header 220 or inner acknowledgement header 325b without an attached payload. The respective header 220 or inner acknowledgement header 325b includes acknowledgement information to properly identify the acknowledged frame, e.g., the frame sequence number of the acknowledged frame. In this particular embodiment the header 220 in the acknowledgement frame 650 identifies the inner frame that includes the data payload 345a from the first layered burst frame 640 addressed to the second device 620, and the inner acknowledgement headers 325b in the second layered burst frame 660 identify the inner frames that include the data payloads 345a from the first layered burst frame 640 addressed to the third device 620. By placing the acknowledgement information in the headers 220, 325b, this further reduces the overhead by reducing the size of acknowledgement frames.

Transmitter Operation

Figure 9:
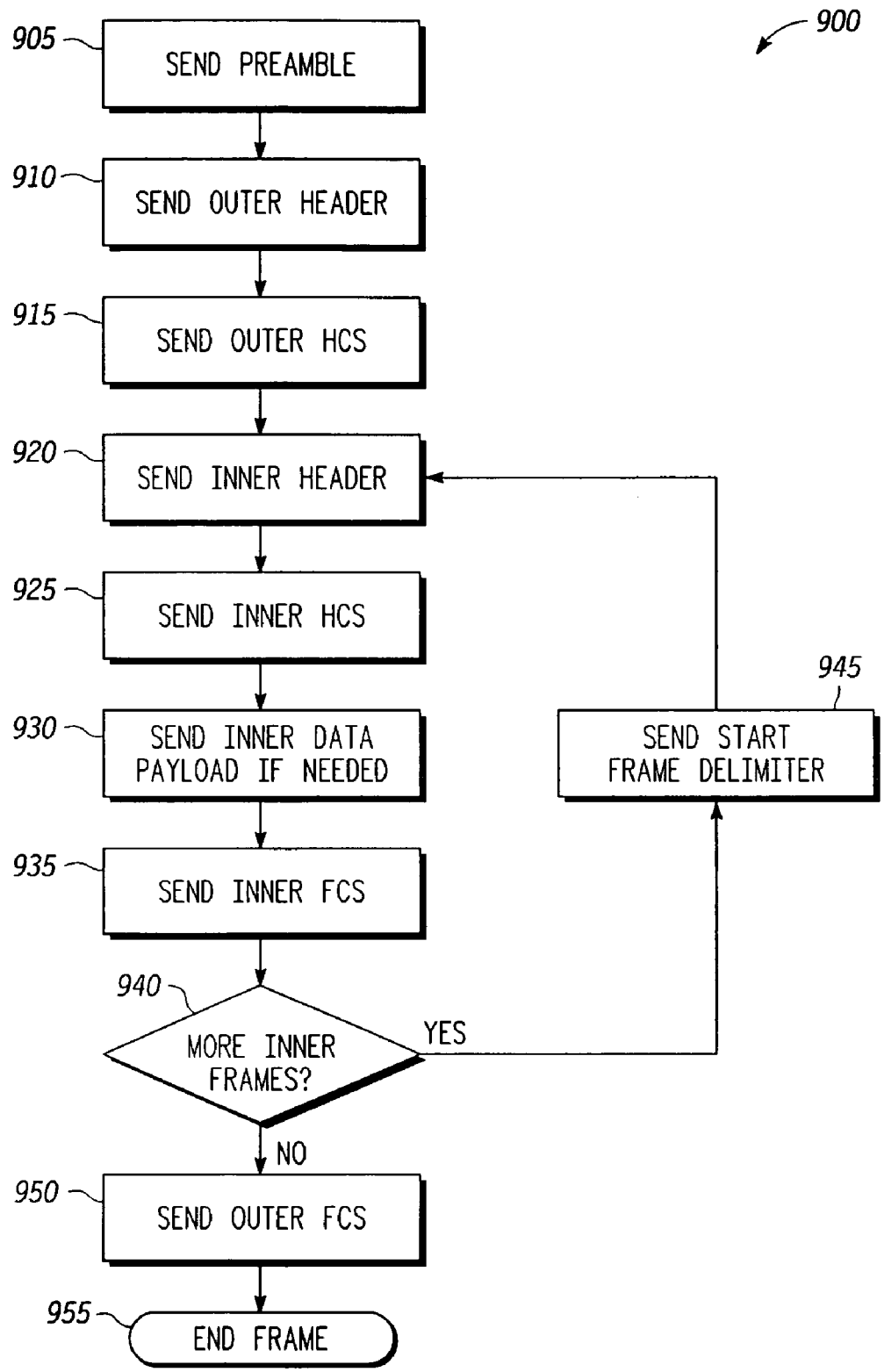
FIG. 9 is a flow chart of the operation of a source device in transmitting a layered burst frame, according to a disclosed embodiment of the present invention.

FIG. 9 is a flow chart of the operation of a source device in transmitting a layered burst frame, according to a disclosed embodiment of the present invention.

As shown in FIG. 9, transmission of the layered burst frame 300 begins when the source device sends the preamble 310. (905)

After sending the preamble 310 (905), the source device then sends an outer header 320 that includes information about the parameters of the layered burst frame 300. (910)

Then, if an outer HCS 330 is being used, the source device sends the outer HCS 330 to provide a destination device or devices with a way to check the integrity of the outer header 320. (915) Embodiments that don't use an outer HCS 330, can omit this operation.

The source device then sends out the first inner header 325 that includes information about the parameters of the first inner frame 370 (920), followed by an inner HCS 335, if an inner HCS 335 is being used. (925) Embodiments that don't use an inner HCS 335, can omit this second operation.

The source device then sends out an inner payload 345, if the current inner frame 370 includes an inner payload 345. (930) This inner payload 345 can be a data payload, an acknowledgement payload, or any other suitable payload. For inner frames 370 that don't have an inner payload (e.g., certain acknowledgement frames), this operation is skipped.

After sending any required inner payload 345 (or after determining that no inner payload 345 is required) (930), the source device sends an inner FCS 355. (935). The inner FCS 355 provides the destination device or devices with a way to check the integrity of the current inner payload 345 or the current inner frame 370.

Then the source device determines whether there are more inner frames 370 to be sent in the current outer payload 340. (940)

If there are more inner frames 370 to send, the source device sends a start frame delimiter 360 (945), sends the next inner header 325 (920), and continues transmission processing from that point. Embodiments that don't use start frame delimiters 360 between inner frames 370 can omit this operation.

If, however, the source device determines that there are no more inner frames 370 to transmit in the current outer payload 340 (940), the source device then sends an outer FCS 3505. (950). The outer FCS 350 provides the destination device or devices with a way to check the integrity of the current outer payload 340 or the current layered burst frame 300.

At this point transmission of the layered burst frame 300 ends. (955)

Receiver Operation

Figure 10:
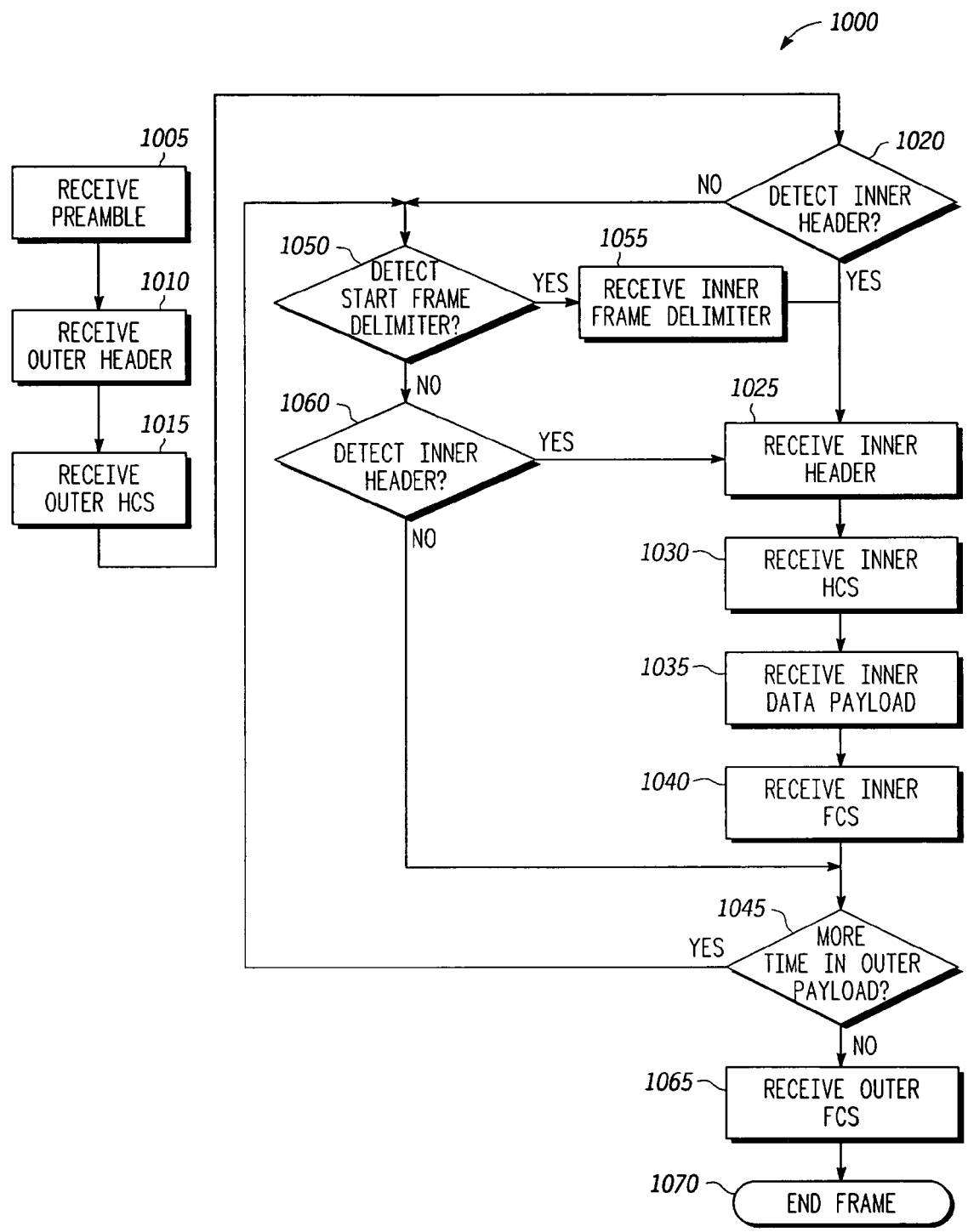
FIG. 10 is a flow chart of the operation of a destination device in receiving a layered burst frame, according to a disclosed embodiment of the present invention.

FIG. 10 is a flow chart of the operation of a destination device in receiving a layered burst frame, according to a disclosed embodiment of the present invention.

As shown in FIG. 10, receipt of the layered burst frame 300 begins when the destination device receives the preamble 310. (1005)

After receiving the preamble 310 (1005), the destination device then receives an outer header 320 that includes information about the parameters of the layered burst frame 300. (1010)

Then, if an outer HCS 330 is being used, the destination device receives the outer HCS 330, which provides the destination device with a way to check the integrity of the outer header 320. (1015) Embodiments that don't use an outer HCS 330, can omit this operation.

The destination device then looks for an inner header. (1020) If the destination device finds an inner header 325, it will proceed to receive the inner header 325, which includes information about the parameters of the first inner frame 370 (1025)

Then the destination device receives an inner HCS 335, if an inner HCS 335 is being used. (1030) Embodiments that don't use an inner HCS 335, can omit this second operation.

The destination device then receives an inner payload 345 if the current inner frame 370 includes an inner payload 345. (1035) This inner payload 345 can be a data payload, an acknowledgement payload, or any other suitable payload. For inner frames 370 that don't have an inner payload (e.g., certain acknowledgement frames), this operation is skipped.

After receiving the inner payload 345 (1035), the destination device receives an inner FCS 355. (1040). The inner FCS 355 provides the destination device with a way to check the integrity of the current inner payload 345, or the current inner frame 370.

Then the destination device determines whether there is more time left in the current outer payload 340. (1045) The destination device can perform this function since it knows how much time has elapsed in the layered burst frame 300, and how much time the outer header 320 has said will be in the layered burst frame 300.

If the destination device determines that there is more time in the layered burst frame 300, or if it fails to detect an inner header (1020), the destination device looks to see if it can detect a start frame delimiter 360 (1050). If it can, then the destination device receives the start frame delimiter 360 (1055) followed by the next inner header (1025), and frame processing continues from that point. Embodiments that don't use start frame delimiters 360 between inner frames 370 can omit the operations of looking for and receiving start frame delimiters 360.

If the destination device does not detect a start frame delimiter 360 (1050), it determines whether it nevertheless detects the next inner header 325 (1060). If it can, then the destination device receives the detected inner header (1025), and frame processing continues from that point.

If the destination device cannot detect the start frame delimiter 360 (1050) and cannot detect the next inner header 325 (1060), the destination device determines whether there is more time left in the current outer payload 340 based on the frame duration provided by the outer header 320. (1045).

If more time remains, the destination device continues to look for a start frame delimiter 360 (1050) or an inner header 325 (1060) until it either finds one or determines that the frame duration has elapsed. (1065) It should be noted that although the processes of detecting a start frame delimiter 360 (1050), detecting an inner header 325 (1060) and determining whether the frame duration has elapsed (1065) are shown as being performed in a set order, they can in practice be performed in tandem.

If, however, the destination device determines that there is no more time remaining in the outer payload 340 (1045), the destination device then proceeds to receive an outer FCS 350. (1065). The outer FCS 350 provides the destination device with a way to check the integrity of the current outer payload 340, or the current layered burst frame 300.

At this point reception of the layered burst frame 300 ends. (1070)

In the method shown in FIG. 10, each time an HCS 330, 335 or FCS 350, 355 is received, it is also used to check the validity of the respective header 230, 235 or frame 300, 370. Should the respective check sequence indicate failure, the destination device will address such a failure accordingly. If it is the outer header 330 or outer frame 300 that fails, then the destination device may request that the entire layered burst frame be repeated. If it is just an inner header 335 or an inner frame 370 that fails, the destination device may continue processing other inner frames and request that the failed inner frame be resent.

Methods of Sending and Receiving Layered Burst Frames

A method is provided for operating a transceiver. The method comprises: transmitting a preamble; transmitting an outer header identifying parameters of an outer payload, after transmitting the preamble; and transmitting the outer payload after transmitting the outer header. The transmitting of the outer payload includes: transmitting an inner header identifying parameters of an inner payload; transmitting an inner payload after transmitting the inner header; and repeating the transmitting of the inner header and the transmitting of the inner payload a plurality of times.

The method may further comprise transmitting an outer header check sequence after transmitting the outer header but before transmitting the outer payload. The method may further comprise transmitting an outer frame check sequence after the outer payload. The method may further comprise transmitting an inner header check sequence after transmitting each of the inner headers but before transmitting a corresponding inner payload. The method may further comprise transmitting an inner frame check sequence after transmitting each of the inner payloads.

The method may further comprise transmitting a start frame delimiter between iterations transmitting an inner header and transmitting an inner payload. The method may further comprise receiving an acknowledgement frame from one of the one or more remote devices.

The acknowledgement frame may be one of: an immediate acknowledgement frame having no payload, and a delayed acknowledgement frame having an acknowledgement payload. The acknowledgement frame may include an acknowledgement header identifying a frame sequence number of one of the inner headers.

In this method, each of inner data frames are associated with a plurality of destination devices.

The method may be implemented in an ultra wideband device, and may be implemented in an integrated circuit.

A method of operating a receiver device is also provided. This method comprises: receiving a preamble; receiving an outer header identifying parameters of an outer payload, after receiving the preamble; and receiving the outer payload after receiving the outer header. The receiving of the outer payload includes: receiving an inner header identifying parameters of an inner payload, receiving an inner payload after receiving the inner header, and repeating the receiving of the inner header and the receiving of the inner payload a plurality of times. The parameters of the outer payload include an outer payload length.

The method may further comprise ending the receiving of the outer payload when a duration equal to the payload length has passed after receiving the outer header. The method may further comprise entering into an acquisition mode when one of: a duration equal to the payload length has passed after receiving the outer header, or a duration equal to the payload length plus a frame check sequence length has passed after receiving the outer header.

The method may further comprise receiving an outer frame check sequence when a duration equal to the payload length has passed after receiving the outer header. The method may further comprise receiving an outer header check sequence after receiving the outer header but before receiving the outer payload. The method may further comprise receiving an inner header check sequence after receiving each of the inner headers but before receiving a corresponding inner payload. The method may further comprise receiving an inner frame check sequence after receiving each of the inner payloads.

The method may further comprise receiving a start frame delimiter between iterations of receiving an inner header and receiving an inner payload.

The method may be implemented using an ultra wideband receiving device. The method may be implemented in an integrated circuit.

A method of operating a transceiver is provided. This method comprises: transmitting an outgoing preamble; transmitting an outgoing outer header identifying outgoing parameters of an outgoing outer payload, after transmitting the outgoing preamble; transmitting the outgoing outer payload including N outgoing inner data frames, the N outgoing inner data frames including N outgoing inner headers and N outgoing inner payloads, respectively; receiving an incoming preamble; receiving an incoming outer header identifying incoming parameters of an incoming outer payload, after receiving the incoming preamble; and receiving the incoming outer payload including M incoming inner data frames. In this method, at least one of the M incoming inner data frames is an acknowledgement frame for at least one of the N outgoing inner data frames, N is an integer greater than one, and M is an integer greater than one.

In this method, the M incoming inner data frames may including M incoming inner headers and M incoming inner payloads, respectively, and at least one of the M incoming inner payloads may be an acknowledgement payload acknowledging one or more of the N outgoing inner payloads.

In this method, the M incoming inner data frames may include M incoming inner headers, respectively, and at least one of the M incoming inner headers may include an identifier for one or more of the N outgoing inner payloads.

The method may be implemented in an ultra wideband transmitter, and it may be implemented in an integrated circuit.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of operating a transceiver, comprising:
   transmitting a preamble;
   transmitting an outer header identifying parameters of an outer payload, after transmitting the preamble;
   transmitting an outer header check sequence after transmitting the outer header; and
   transmitting the outer payload after transmitting the outer header check sequence, the transmitting of the outer payload including:
      transmitting a first inner header identifying parameters of a first inner payload,
      transmitting the first inner payload after transmitting the first inner header,
      transmitting a second inner header identifying parameters of a second inner payload, and
      transmitting the second inner payload after transmitting the second inner header,
   wherein the first inner header includes a first destination address for the first inner payload, and
   wherein the second inner header includes a second destination address for the second inner payload, and
   wherein the first destination address is different from the second destination address.

2. A method of operating a transceiver, as recited in claim 1, the method further comprising transmitting an outer frame check sequence after the outer payload.

3. A method of operating a transceiver, as recited in claim 1, further comprising transmitting an inner header check sequence after transmitting each of the inner headers but before transmitting a corresponding inner payload.

4. A method of operating a transceiver, as recited in claim 1, further comprising transmitting an inner frame check sequence after transmitting each of the inner payloads.

5. A method of operating a transceiver, as recited in claim 1, further comprising:
   transmitting a staff frame delimiter between transmitting an, the first inner payload and transmitting the second inner header,
   wherein the transmitting of the second inner header takes place after the transmitting of the first inner payload.

6. A method of operating a transceiver, as recited in claim 1, further comprising receiving an acknowledgement frame from one of the one or more remote devices.

7. A method of operating a transceiver, as recited in claim 6, wherein the acknowledgement frame is one of: an immediate acknowledgement frame having no payload, and a delayed acknowledgement frame having an acknowledgement payload.

8. A method of operating a transceiver, as recited in claim 6, wherein the acknowledgement frame includes an acknowledgement header identifying a frame sequence number of one of the inner headers.

9. A method of operating a transceiver, as recited in claim 1, wherein each of inner data frames are associated with a plurality of destination devices.

10. A method of operating a transceiver, as recited in claim 1, wherein the method is implemented in an ultra wideband device.

11. A method of operating a transceiver, as recited in claim 1, wherein the method is implemented in an integrated circuit.

12. A method of operating a receiver device, comprising:
receiving a preamble;
receiving an outer header including identification parameters of an outer payload, after receiving the preamble;
receiving the outer payload after receiving the outer header, the receiving of the outer payload including:
receiving an inner header identifying parameters of an inner payload,
receiving the inner payload after receiving the inner header, and
repeating the receiving of the inner header and the receiving of the inner payload a plurality of times; and
ending the receiving of the outer payload when a duration equal to the outer payload length value has passed after receiving the outer header,
wherein the identification parameters of the outer payload include an outer payload length value.

13. A method of operating a receiver device, as recited in claim 12, further comprising entering into an acquisition mode when one of: a duration equal to the payload length has passed after receiving the outer header, or a duration equal to the payload length plus a frame check sequence length has passed after receiving the outer header.

14. A method of operating a receiver device, as recited in claim 12, further comprising receiving an outer frame check sequence when a duration equal to the outer payload length value has passed after receiving the outer header.

15. A method of operating a receiver device, as recited in claim 12, further comprising receiving an outer header check sequence after receiving the outer header but before receiving the outer payload.

16. A method of operating a receiver device, as recited in claim 12, further comprising receiving an inner header check sequence after receiving each of the inner headers but before receiving a corresponding inner payload.

17. A method of operating a receiver device, as recited in claim 12, further comprising receiving an inner frame check sequence after receiving each of the inner payloads.

18. A method of operating a receiver device, as recited in claim 12, further comprising:
receiving a start frame delimiter between iterations of receiving an inner header and receiving an inner payload wherein the start frame delimiter has a constant value during each receiving operation.

19. A method of operating a receiver device, as recited in claim 12, wherein the method is implemented in an integrated circuit.

20. A method of operating a transceiver, comprising:
transmitting an outgoing preamble;
transmitting an outgoing outer header identifying outgoing parameters of an outgoing outer payload, after transmitting the outgoing preamble;
transmitting an outgoing outer header check sequence after transmitting the outgoing outer header;
transmitting the outgoing outer payload after transmitting the outgoing outer header check sequence, the outgoing outer payload including N outgoing inner data frames, the N outgoing inner data frames including N outgoing inner headers and N outgoing inner payloads, respectively, each of the N outgoing inner headers identifying parameters of a corresponding one of the N outgoing inner payloads, each of the N outgoing inner payloads being transmitted after a corresponding one of the N outgoing inner headers;
receiving an incoming preamble;
receiving an incoming outer header identifying incoming parameters of an incoming outer payload, after receiving the incoming preamble;
receiving an incoming outer header check sequence after receiving the incoming outer header; and
receiving the incoming outer payload, after receiving the incoming outer header check sequence, the incoming outer payload including M incoming inner data frames,
wherein at least one of the M incoming inner data frames is an acknowledgement frame for at least one of the N outgoing inner data frames,
wherein N is an integer greater than one, and
wherein M is an integer greater than one.

21. A method of operating a transceiver, as recited in claim 20,
wherein the M incoming inner data frames including M incoming inner headers and M incoming inner payloads, respectively, and
wherein at least one of the M incoming inner payloads is an acknowledgement payload acknowledging one or more of the N outgoing inner payloads.

22. A method of operating a transceiver, as recited in claim 20,
wherein the M incoming inner data frames including M incoming inner headers, respectively, and
wherein at least one of the M incoming inner headers includes an identifier for one or more of the N outgoing inner payloads.

23. A method of operating a transceiver, as recited in claim 20, the method being implemented in an integrated circuit.

24. A method of operating a transceiver, as recited in claim 1, wherein the transmitting of the outer payload further comprises:
transmitting one or more additional inner headers identifying parameters of one or more inner payloads,
transmitting the one or more-inner payloads after transmitting the corresponding additional inner headers.

25. A method of operating a transceiver, as recited in claim 1, further comprising
transmitting the start frame delimiter between transmitting the second inner payload and transmitting a third inner header,
wherein the transmitting of the third inner header takes place after the transmitting of the second inner payload, and
wherein the start frame delimiter remains constant for each transmission.

* * * * *